US011519563B2

(12) United States Patent
Vissenberg et al.

(10) Patent No.: US 11,519,563 B2
(45) Date of Patent: Dec. 6, 2022

(54) LIGHT-EMITTING DEVICE

(71) Applicant: SIGNIFY HOLDING B.V., Eindhoven (NL)

(72) Inventors: Michel Cornelis Josephus Marie Vissenberg, Roermond (NL); Alexander Henricus Waltherus Van Eeuwijk, Eindhoven (NL); Dragan Sekulovski, Eindhoven (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 17/599,693

(22) PCT Filed: Mar. 31, 2020

(86) PCT No.: PCT/EP2020/059037
§ 371 (c)(1),
(2) Date: Sep. 29, 2021

(87) PCT Pub. No.: WO2020/207852
PCT Pub. Date: Oct. 15, 2020

(65) Prior Publication Data
US 2022/0196213 A1 Jun. 23, 2022

(30) Foreign Application Priority Data
Apr. 9, 2019 (EP) .................................... 19168162

(51) Int. Cl.
*F21K 9/232* (2016.01)
*F21K 9/61* (2016.01)
*F21Y 115/10* (2016.01)
(52) U.S. Cl.
CPC ............... *F21K 9/232* (2016.08); *F21K 9/61* (2016.08); *F21Y 2115/10* (2016.08)

(58) Field of Classification Search
CPC ................................... F21K 9/61; F21K 9/232
See application file for complete search history.

(56) References Cited

U.S. PATENT DOCUMENTS 9,255,667 B2    2/2016  Zhang et al.
2015/0109791 A1 4/2015  Johnston et al.
(Continued)

FOREIGN PATENT DOCUMENTS

CN    204254304 U    4/2015
CN    107339621 A    11/2017
(Continued)

*Primary Examiner* — William N Harris (57) ABSTRACT

A light-emitting device (1) is provided. The light-emitting device (1) comprises a transparent light exit window (10), and a light-emitting diode, LED, filament (2) adapted for emitting a first light output along one or more light output directions through the transparent light exit window (10). The light-emitting device (1) comprises a light guide (3). The light guide (3) comprises an incoupling feature (4), configured for receiving light emitted by a light source (2, 7) and for coupling of the light emitted by the light source (2, 7) into the light guide (3). The light source (2, 7) comprises or is constituted by at least one of the LED filament (2) or a separate light source (7) comprised in the light-emitting device (1). The light guide (3) further comprises at least one internal surface (5) adapted for internal reflection of the incoupled light within the light guide (3), and an outcoupling feature (6) configured for outcoupling of light having been internally reflected within the light guide (3) from the light guide (3) thereby emitting a second light output, the second light output being superimposed onto the first light output when viewed along the one or more light output directions.

9 Claims, 5 Drawing Sheets

(56) References Cited

U.S. PATENT DOCUMENTS

| | | | |
|---|---|---|---|
| 2016/0161062 A1* | 6/2016 | Bergmann | F21V 23/006 |
| | | | 362/297 |
| 2016/0273716 A1* | 9/2016 | Tarsa | F21K 9/61 |
| 2016/0356461 A1 | 12/2016 | Lai | |
| 2018/0031183 A1* | 2/2018 | Wegh | F21V 29/83 |
| 2019/0226644 A1* | 7/2019 | Van Bommel | F21K 9/232 |

FOREIGN PATENT DOCUMENTS

| | | |
|---|---|---|
| WO | 2015135817 A1 | 9/2015 |
| WO | 2016128509 A1 | 8/2016 |

\* cited by examiner

LIGHT-EMITTING DEVICE

CROSS-REFERENCE TO PRIOR APPLICATIONS

This application is the U.S. National Phase application under 35 U.S.C. § 371 of International Application No. PCT/EP2020/059037, filed on Mar. 31, 2020, which claims the benefit of European Patent Application No. 19168162.6, filed on Apr. 9, 2019. These applications are hereby incorporated by reference herein.

TECHNICAL FIELD

The present invention is related to a light-emitting device (or lighting device) comprising at least one light-emitting diode (LED) filament and at least one light guide, which light guide may have a transparent appearance when the at least one LED filament is turned off (not emitting light).

BACKGROUND

Solid state lighting devices, such as LED based lamps, are increasingly replacing incandescent lamps in most fields of use. Compared to incandescent lamps, fluorescent lamps, gas discharge lamps, etc., solid state based light sources may provide numerous advantages such as, inter alia, longer operational life, reduced power consumption, higher efficacy, less heat generation, green environmental products (i.e. not including mercury). Solid state lighting devices such as LEDs are employed in a wide range of lighting applications, such as, for example, general lighting. LEDs are advantageous since they may allow for a relatively simple control of the emitted light for example with respect to dimming and color setting. However, many users still enjoy the appearance of incandescent lamps, but still want to enjoy the benefits which comes with switching to LED based lamps and lighting. It may thus be appreciated by the user to have retrofit lamps which have the appearance of an incandescent light bulb. To this end, the available infrastructure for producing incandescent light bulbs based on glass bulbs may be employed, and the incandescent filament wire may be replaced with LEDs emitting white light. This has created the solution of creating LED lamps and bulbs that resemble the appearance of incandescent lamps, luminaires and bulbs, wherein the filament wire of the incandescent lamps, luminaires and bulbs are replaced with LED light sources.

One concept includes LEDs arranged on a carrier and possibly sealed or covered by a component to produce the appearance of filaments, of various shapes, which may be referred to as LED filaments. LED filaments may be positioned inside a transparent or translucent bulb. The LED filament(s) may be connected to a module, which may comprise electrical wiring and/or a power supply.

Solutions according to, or similar, to the concept mentioned above are often able to produce the intended effect of resembling the appearance of an incandescent lamp when the LED filament(s) is/are operated so as to emit light having a relatively low intensity. However, when the intensity of the light emitted by the LED filament(s) is increased, the light emitted by the lamp may produce an uncomfortable glare for a viewer (which in alternative may be referred to as the user).

SUMMARY

In view of the above discussion, a concern of the present invention is to provide a light-emitting device including at least one LED filament, which light-emitting device is able to emit light that only to a very limited degree produce glare for a viewer when the intensity of the light emitted by the at least one LED filament is relatively high.

To address at least one of this concern and other concerns, a light-emitting device in accordance with the independent claim is provided. Preferred embodiments are defined by the dependent claims.

According to a first aspect of the present invention, a light-emitting device is provided. The light-emitting device comprises a transparent light exit window. The light-emitting device comprises a, or at least one, LED filament adapted for emitting a first light output along one or more light output directions through the transparent light exit window, and a, or at least one, light guide. The light guide comprises an, or at least one, incoupling feature configured for receiving light emitted by a, or at least one, light source and for coupling the light emitted by the light source into the light guide. The light source comprises or is constituted by at least one of the LED filament or a separate light source comprised in the light-emitting device. The light guide further comprises at least one internal surface adapted for internal reflection of the incoupled light within the light guide, and an, or at least one, outcoupling feature configured for outcoupling of light having been internally reflected within the light guide from the light guide, thereby emitting a second light output. The second light output is superimposed onto the first light output when viewed along the one or more light output direction.

The incoupling feature may in alternative be referred to as an incoupling element or incoupling surface, and the outcoupling feature may be referred to as an outcoupling element or outcoupling surface.

It will be appreciated that the light-emitting device according to the first aspect of the present invention may reduce or avoid any uncomfortable glare in the light emitted by the light-emitting device, as compared to other LED filament based light-emitting devices, lamps or luminaires. The light-emitting device may reduce the contrast between the light emitted by the LED filament and its direct surroundings. By controlling operation of the LED filament and/or the light source, the outcoupling of light from the light guide may have a luminous flux that is different from the luminous flux of the light emitted by the LED filament. The different luminous fluxes of the light outcoupled by the light guide and the light emitted by the LED filament may provide a softer brightness transition from the light emitted by the light-emitting device to its surroundings, and may reduce any uncomfortable glare and/or the contrast between the light emitted by the light-emitting device and its surroundings as perceived by a viewer. The LED filament and the light guide may be perceived by a viewer as a single light source (e.g., when the LED filament is emitting light and light is outcoupled from the light guide). At modes of operation of the light-emitting device (where different modes of operation are achieved for example by controlling operation of the LED filament and/or the light source) when the luminous flux of the light outcoupled from the light guide is relatively high, the light guide may have an appearance of a frosted lamp or be perceived by a viewer as having an appearance of a frosted lamp. The implementation of the light guide may be regarded as a controllable diffusor.

The transparent light exit window may at least in part define a space in which other parts of the light-emitting device may be arranged. The transparent light exit window may be configured to at least in part enclose the LED filament and/or the light guide. The transparent light exit window may in principle have any shape, for example a pear-shape, or tube-shape. The transparent light exit window may for example be made of glass and/or plastic.

The light guide may for example have a shape according to a plate or sheet, or a shape substantially according to a plate or sheet. However, other shapes of the light guide are contemplated.

The light guide may be arranged such that the outcoupling feature is not visible, or substantially not visible (e.g., visible to only a very limited degree, or hardly perceivable), to the naked eye of a viewer, e.g., at a distance of at least one meter between the naked eye of the viewer and the light guide (or the outcoupling feature of the light guide), when no light is incoupled into the at least one light guide. In the context of the present application, by the light guide being arranged such that the outcoupling feature is not visible, or substantially not visible, to the naked eye of a viewer, it is meant that the outcoupling feature is not visible, or substantially not visible, to a viewer not having impaired vision (e.g., not suffering from nearsightedness) and without any visual aid or a viewer with impaired vision but being provided with a visual aid device for vision correction such as eye glasses (but not necessarily to a viewer using an optical instrument such as a microscope or the like). In light-emitting devices where LED filaments are used for decorative reasons, the uncomfortable glare produced by the LED filaments may limit the devices to only operate in modes where the luminous flux of the light emitted by the LED filaments is low enough to not cause any uncomfortable glare. With a light guide that is arranged such that the outcoupling feature is not visible to the naked eye of a viewer, the light-emitting device may be used for decorative reasons and still be operable at modes where the luminous flux of the light emitted by the LED filament would otherwise cause uncomfortable glare. The clear appearance of the light guide element may be most prominent when viewed perpendicularly. When the LED filament is in an off mode (not emitting light), the light guide may have a minimal impact on the clear appearance of the light-emitting device. For achieving or implementing an arrangement of the light guide such that the at least one outcoupling feature is not visible, or substantially not visible, to the naked eye of a viewer when no light is incoupled into the at least one light guide, a light guide with a fine distribution of relatively small outcoupling features (which are not or only to a (very) limited degree perceivable to the naked eye of a viewer), e.g. in the form of paint dots, on one or more surfaces of the light guide may be employed, for example. In alternative, or in addition, the light guide may be arranged with an internal refractive filler particle structure that may comprise filler particles, wherein at least some of the filler particles may have different refractive indexes. The filler particles may have different refractive indexes compared to material in the light guide surrounding the filler particles, which material may be referred to as the host material of the light guide. For example, the host material may comprise poly(methyl methacrylate) (PMMA), having for example a refractive index of 1.49, or about 1.49, and one or more of the filler particles may comprise silicone, having for example a refractive index of 1.42, or about 1.42. Other ways of achieving or implementing an arrangement of the light guide such that the outcoupling feature is not visible, or substantially not visible, to the naked eye of a viewer when no light is incoupled into the light guide are however possible.

The incoupling feature may comprise a surface structure integrally arranged in an outer surface of the light guide and/or a structure arranged on (e.g., attached, or fixed, to) an outer surface of the light guide. The surface structure integrally arranged in an outer surface of the light guide and/or the structure arranged on an outer surface of the light guide may be configured for incoupling of light. The surface structure that may be integrally arranged in an outer surface of the light guide may for example comprise or be constituted by one or more edges, indents and/or facets configured for incoupling of light. The surface structure that may be integrally arranged in an outer surface of the light guide may for example comprise or be constituted by an edge surface of the light guide that may be perpendicular, or substantially perpendicular, to an inner surface of the light guide for internal reflection (e.g., total internal reflection) of light within the light guide. Similarly, the structure that may be arranged on an outer surface of the light guide may for example comprise or be constituted by one or more edges, indents, and/or facets, and/or one or more paint dots. The structure arranged on an outer surface of the light guide may additionally have decorative features.

Possibly, the same element(s) of the light guide may provide both a light incoupling and a light outcoupling functionality. Stated in another way, the incoupling feature may be configured to comprise the at least outcoupling feature, or vice versa. For example, the surface structure that may be integrally arranged in an outer surface of the light guide may for example also be configured for outcoupling of light, and may comprise or be constituted by an edge, an indent and/or a facet configured for outcoupling of light.

The outcoupling feature may be arranged such that the outcoupling of light via the outcoupling feature is over the entirety of an outer surface of the light guide and/or is evenly spread over the entirety of an outer surface of the light guide. The outcoupling feature may comprise a fine distribution of tiny particles and/or a scattering light guide material, which may be invisible, or substantially invisible, to the naked eye of a viewer. The light outcoupled from the light guide may appear to a viewer as being uniformly distributed over an outer surface of the light guide. At modes of operation of the light-emitting device (where different modes of operation are achieved for example by controlling operation of the LED filament and/or the light source) where the luminous flux of the light outcoupled from the light guide is above a predetermined threshold value, the light guide may have a frosted appearance.

The light guide may be arranged to at least in part enclose the LED filament. Possibly, the light guide could be arranged to completely enclose the LED filament. When light is outcoupled from the light guide, any uncomfortable glare produced by the LED filament may be reduced. The difference between the luminous flux of the light outcoupled from the light guide and the luminous flux of the light emitted by the LED filament may provide a softer brightness transition when viewed by the naked eye of a viewer, and this effect may be enhanced when the at one LED filament is at least in part enclosed by the light guide.

The LED filament may extend at a distance from and along an outer surface of the light guide. The LED filament may for example extend in parallel with the outer surface of the light guide. The LED filament may for example be arranged at an angle, or be tilted, with respect to the outer surface of the light guide. The outer surface of the at least light guide may extend in a direction that is parallel, or substantially parallel, with a longitudinal axis of the light-emitting device. The light guide may be closer to a longitudinal axis of the light-emitting device than the LED filament. The outer surface of the light guide may be centred with regards to a longitudinal axis of the light-emitting device.

The light guide may be configured as an envelope, or an at least in part light-guiding surface structure. The at least in part light-guiding surface structure or envelope may at least in part define a space in which other parts of the light-emitting device may be arranged. The at least in part light-guiding surface structure or envelope may in principle have any shape, for example a pear-shape, or tube-shape. The envelope may be configured to at least in part enclose the LED filament. The light guide may be configured as a part of an envelope or an at least in part light-guiding surface structure.

The light source may for example comprise or be constituted by the LED filament. The LED filament may hence be arranged to emit light that may be received by the incoupling feature. Thus, the incoupling feature may be configured for incoupling of light emitted by the LED filament. The arrangement of the light source and the incoupling feature may be such that the light source emits light towards incoupling feature, which may be one or more edges, indents and/or facets of the light guide.

In alternative, or in addition, the light-emitting device may comprise an auxiliary LED light source. The light source may comprise or be constituted by the auxiliary LED light source. In that case, the incoupling feature may or may not be configured for incoupling of light emitted by the LED filament. The incoupling feature may be configured for incoupling of light emitted by the auxiliary LED light source. The auxiliary LED light source may be operated independently with respect to operation of the LED filament. The auxiliary LED light source and the incoupling feature may be arranged such that all, or substantially all, of the light emitted by the auxiliary LED light source is incoupled to the light guide. The light guide may be arranged to cover or enclose the auxiliary LED light source. The auxiliary LED light source may be arranged in the light-emitting device such that it may not be seen by a viewer looking at the light-emitting device from a distance, e.g., from a distance of one or two meters or more.

The outcoupling feature may comprise at least one of: a surface structure integrally arranged in an outer surface of the light guide, a structure arranged on an outer surface of the light guide, or an internal structure within the light guide. The surface structure integrally arranged in an outer surface of the light guide may be configured for outcoupling of light. The structure arranged on an outer surface of the light guide and the internal structure within the light guide may be configured for refraction of light and/or total internal reflection of light. The surface structure integrally arranged in an outer surface of the light guide may comprise or be constituted by one or more edges, indents, facets, and/or a refractive filler particle structure. The refractive filler particle structure may for example comprise filler particles of which at least a portion of the filler particles have different refractive indexes. The structure arranged on an outer surface of the light guide may for example comprise paint, e.g., paint dots.

The light source may be configured to emit light for incoupling into the light guide such that the light outcoupled from the light guide has a lower luminous flux than the luminous flux of the light emitted by the LED filament. The difference in luminous fluxes of the outcoupled light from the light guide and the light emitted by the LED filament may reduce any uncomfortable glare in the light emitted by the light-emitting device and/or the contrast between the light emitted by the LED filament and its direct surroundings.

The light source may be configured to emit light for incoupling into the light guide when the luminous flux of the light emitted by the LED filament is above a predetermined value. The predetermined value may be set at or below the value of luminous flux of the LED filament which is perceived by a viewer as causing uncomfortable glare. Incoupling of light into the light guide when the luminous flux of the light emitted by the LED filament is above a predetermined value may facilitate achieving a transparent appearance of the light guide.

The light source may be configured to increase the luminous flux of its emitted light for incoupling into the light guide if the luminous flux of the light emitted by the LED filament increases. For example, the light source may comprise a plurality of light sources, and may be configured to increase the luminous flux of its emitted light for incoupling into the light guide by turning on additional light source so as to emit light, in case the additional light source was not previously turned on so as to emit light.

The luminous flux of the light outcoupled by the light guide may be adapted by selectively employing a plurality of incoupling features of the light guide for incoupling of light therein. By increasing the number of incoupling features of the light guide employed for incoupling of light therein, an increasing amount of light may be incoupled into the light guide, and accordingly an increasing luminous flux of the light outcoupled by the light guide may be achieved.

The light source may be configured to emit light for incoupling into the light guide such that the luminous flux of the emitted light for incoupling is higher than the luminous flux of the light emitted by the LED filament when the luminous flux of the light emitted by the LED filament is above a predetermined value. The light source may for example be arranged such that the luminous flux of the light outcoupled from the light guide is at a constant ratio to the luminous flux of light emitted by the LED filament.

The light-emitting device may comprise a driver unit, which may be configured to control operation of the light source and/or the LED filament. The driver unit may be coupled to the light source and/or the LED filament, and may be for example be configured to control the luminous flux of the light emitted by the light source and/or the luminous flux of the light emitted by the LED filament.

According to a second aspect of the present invention, a lamp, luminaire or lighting system is provided. The lamp, luminaire or lighting system comprises a light-emitting device according to the first aspect of the present invention.

The LED filament may comprise a plurality of LEDs. The light source may for example comprise one or more LEDs.

Each or any of the LEDs of the LED filament and the light source may comprise inorganic LED(s) and/or organic LED(s) (OLEDs). Possibly, the LED filament could comprise, in addition to LEDs, another or other types of light sources, such as another or other types of solid state light emitters. And possibly, the light source could comprise, in alternative or in addition to LEDs, another or other types of light sources, such as another or other types of solid state light emitters. Solid state light emitters are relatively cost efficient light sources since they in general are relatively inexpensive and have a relatively high optical efficiency and a relatively long lifetime. However, in the context of the present application, the term "light source" should be understood to mean substantially any device or element that is capable of emitting radiation in any region or combination of regions of the electromagnetic spectrum, for example the visible region, the infrared region, and/or the ultraviolet region, when activated e.g. by applying a potential difference across it or passing a current through it. Therefore, a light source can have monochromatic, quasi-monochromatic, polychromatic or broadband spectral emission characteristics. Examples of light sources include semiconductor, organic, or polymer/polymeric LEDs, violet LEDs, blue LEDs, optically pumped phosphor coated LEDs, optically pumped nano-crystal LEDs or any other similar devices as would be readily understood by a person skilled in the art. Furthermore, the term light source can, according to one or more embodiments of the present invention, mean a combination of the specific light source(s) which emit the radiation in combination with a housing or package within which the specific light source(s) is positioned or arranged. For example, the term light source can encompass a bare LED die arranged in a housing, which may be referred to as a LED package. According to another example, the light source may comprise a Chip Scale Package (CSP) LED, which may comprise a LED die directly attached to a substrate such as a Printed Circuit Board (PCB), and not via a sub-mount.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

Figure 1:
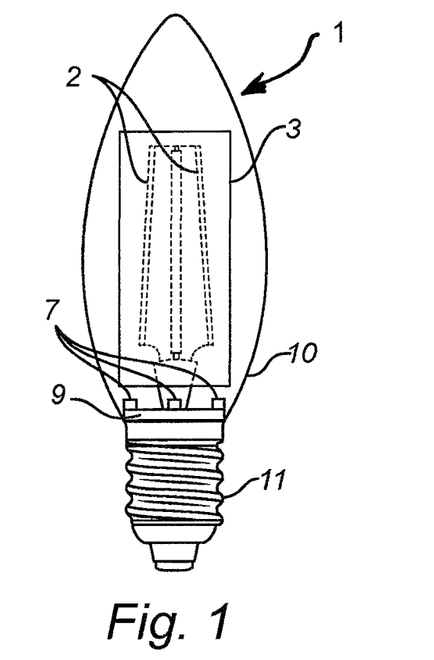
FIG. 1 is a schematic view of a light-emitting device according to an exemplifying embodiment of the present invention.
Figure 2:
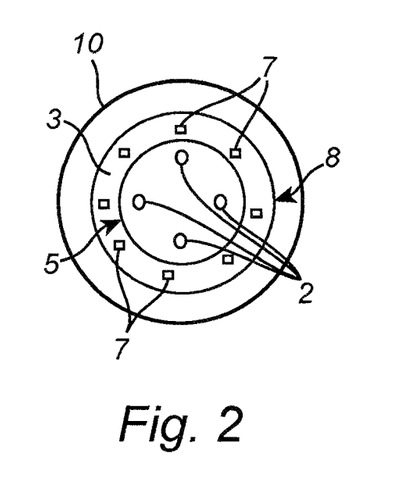
FIGS. 2 to 4 are schematic views of a cross-section of a light-emitting device perpendicular to a longitudinal axis of the light-emitting device, according to exemplifying embodiments of the present invention.

FIG. 1 is a schematic view of a light-emitting device 1 according to an exemplifying embodiment of the present invention. The light-emitting device 1 comprises a transparent light exit window 10. In accordance with the embodiment illustrated in FIG. 1, the light-emitting device 1 comprises four light-emitting diode (LED) filaments 2, but due to that FIG. 1 is a side view of the light-emitting device 1, only two of the LED filaments are shown in FIG. 1. FIG. 2, which is described further in the following, is a cross-sectional view of the light-emitting device 1 illustrated in FIG. 1, and shows all four LED filaments 2. It is however to be understood that there could be any number of LED filaments in the light-emitting device 1, such as one, two, three, or five or more. The LED filaments 2 are adapted for emitting a first light output along one or more light output directions through the transparent light exit window. The light-emitting device 1 further comprises a light guide 3. In accordance with the embodiment of the present invention illustrated in FIG. 1, the light guide 3 is partly enclosing the LED filaments 2. The light guide 3 comprises at least one incoupling feature (not shown in FIG. 1; see FIGS. 3, 4, 6, 8 and 9-16), configured for receiving light emitted by at least one light source and for coupling of the light emitted by the at least one light source into the light guide 3. The at least one light source may comprise or being constituted by one or more of the LED filaments 2 and/or a separate light source comprised in the light-emitting device 1. The light guide 3 comprises at least one internal surface (not shown; see FIGS. 2-4, 6-8, 10-11, and 15-16), adapted for internal reflection of the incoupled light within the light guide 3, and at least one outcoupling feature (not shown in FIG. 1; see FIGS. 7, 12-14, and 16) configured for outcoupling of light having been internally reflected within the light guide 3 from the light guide 3, thereby emitting a second light output, the second light output being superimposed onto the first light output when viewed along the one or more light output directions. It should be noted that the light-emitting device 1 is not limited to include only one light guide, and that the light-emitting device 1 could in principle comprise any number of light guides. In accordance with the embodiment illustrated in FIG. 1, the at least one light source comprises eight auxiliary LED light sources 7. It is to be noted that only three of the auxiliary LED light sources 7 are shown in FIG. 1, due to FIG. 1 being a side view of the light-emitting device 1. As mentioned in the foregoing, FIG. 2, which is described further in the following, is a cross-sectional view of the light-emitting device 1 illustrated in FIG. 1, and shows all eight auxiliary LED light sources 7. It is further to be noted that a configuration including eight auxiliary LED light sources 7 is exemplary, and that the light-emitting device 1 could in principle comprise any number of auxiliary LED light sources 7, such as one, two, three, four, five, six, seven, or ten or more. The light-emitting device 1 is not limited to using auxiliary LED light source 7 for incoupling of light into the light guide 3. In alternative, or in addition, light emitted by the LED filaments 2 may be incoupled into the light guide 3 by means of the at least one incoupling feature. The auxiliary LED light sources 7 may be mounted on a driver unit 9. The driver unit 9 may be configured to control operation of each or any of the auxiliary LED light sources 7 the LED filaments 2. In accordance with the illustrated embodiment, the LED filaments 2 are mounted on the driver unit 9. However, it is to be understood that the light-emitting device 1 is not limited to the embodiment as shown in FIG. 1 with regards to the mounting of LED filaments 2, which is according to an example. Further, in accordance with the embodiment of the present invention illustrated in FIG. 1, the light-emitting device 1 comprises a connector 11. The transparent light exit window 10 may enclose the LED filaments 2 and the light guide 3, and may be connected to the connector 11. The driver unit 9 may be connected to the connector 11. The light-emitting device 1 may be connectable to a lamp or luminaire socket by way of the connector 11. As illustrated in FIG. 1, the connector 11 may comprise an Edison screw base. In alternative or in addition, the connector 11 could however comprise a bayonet fitting or another type of connection suitable for the lamp or luminaire known in the art.

FIG. 2 is a schematic view of a cross-section of a light-emitting device 1 perpendicular to a longitudinal axis of the light-emitting device 1, according to an exemplifying embodiment of the present invention. FIG. 2 is a cross-sectional view of the light-emitting device 1 illustrated in FIG. 1. The light-emitting device 1 may comprise four LED filaments 2. However, it is appreciated that there could be any number of LED filaments 2, such as one, two, three, four, five, or more. The LED filaments 2 are adapted for emitting a first light output along one or more light output directions through the transparent light exit window 10. The light-emitting device 1 further comprises a light guide 3. It should be noted that the configuration in FIG. 2 is exemplary and the light-emitting device 1 could in principle comprise any number of light guides 3. Further, the light guide 3 is not limited to the shape depicted in FIG. 2, which is according to an example. The light guide 3 may enclose the LED filaments 2. The light guide 3 may comprise at least one incoupling feature (not shown in FIG. 2; see FIGS. 3, 4, 6, 8 and 9-16) configured for receiving light emitted by at least one light source and incoupling of the light emitted by at least one light source into the light guide 3. The at least one light source is shown in FIG. 2 as comprising eight auxiliary LED light sources 7. However, there could in principle be any number of auxiliary LED light sources 7. The auxiliary LED light sources 7 may be arranged below the light guide 3. In FIG. 2, the light guide 3 is shown as comprising two internal surfaces 5. However, the light guide 3 may in principle have any number of internal surfaces 5, such as one, two, three, four or more. The internal surfaces 5 may be adapted for internal reflection of the incoupled light within the light guide 3. Further, the light guide 3 may comprise outcoupling features (not shown in FIG. 2; see FIGS. 10-16). The outcoupling features may be configured for outcoupling of light having been internally reflected within the light guide 3 from the light guide 3, thereby emitting a second light output, the second light output being superimposed onto the first light output when viewed along the one or more light output directions. The light guide 3 may further comprise two outer surfaces 8. However, the light guide 3 may have any number of outer surfaces 8. The light guide 3 could have another shape than illustrated in FIG. 2. For example, the light guide could be facetted, and could have vertical facets so as to exhibit for example an octagonal cross-sectional shape. Each facet could be considered as a separate surface of the light guide. The light-emitting device 1 is not limited to using auxiliary LED light sources 7 as the at least one light source to emit light for incoupling into the light guide 3. In alternative, or in addition, light emitted by LED filaments 2 may be incoupled into the light guide 3. The transparent light exit window 10 may enclose the LED filaments 2, the light guide 3 and the auxiliary LED light sources 7. It should however be noted that the cross-sectional shape of the transparent light exit window 10 illustrated in FIG. 2 is exemplary, and that the cross-sectional shape could substantially be of any shape, such as a shape in accordance with an ellipse, a triangle, a square or a pentagon.

Figure 3:
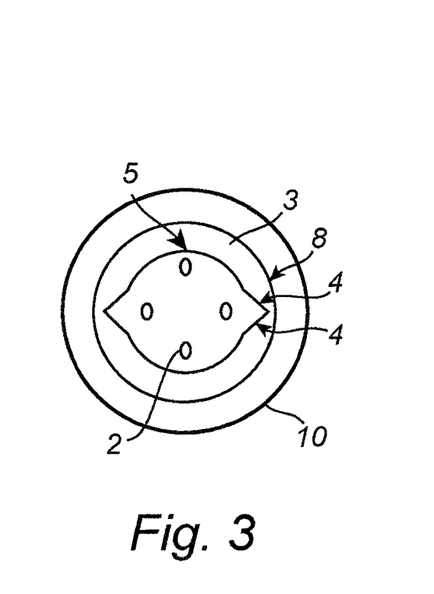

FIG. 3 is a schematic view of a cross-section of a light-emitting device 1 perpendicular to a longitudinal axis of the light-emitting device 1, according to an exemplifying embodiment of the present invention. The light-emitting device 1 illustrated in FIG. 3 is similar to the light-emitting device 1 illustrated in FIG. 2, and the same reference numerals in FIGS. 2 and 3 indicate the same or similar components, having the same or similar function(s). The light-emitting device 1 in FIG. 3 comprises a light guide 3 comprising two incoupling features 4. However, it is appreciated that a light guide 3 may have any number of incoupling features 4. The incoupling features 4 may be configured for incoupling of the light emitted by the LED filaments 2 into the light guide 3. In FIG. 3 the incoupling features 4 are illustrated as being configured as indents and/or facets. The light guide 3 of the light-emitting device 1 is illustrated in in FIG. 3 as comprising two internal, or inner, surfaces 5, adapted for internal reflection of the incoupled light within the light guide 3, and two outer surfaces 8. It should however be noted that the light guide 3 of the light-emitting device 1 could in principle comprise any number of internal surfaces 5 and any number of outer surfaces 8. FIG. 3 illustrates that light emitted by the LED filaments 2 may pass through the light guide 3 and/or be incoupled by the incoupling features 4 into the light guide 3.

Figure 4:
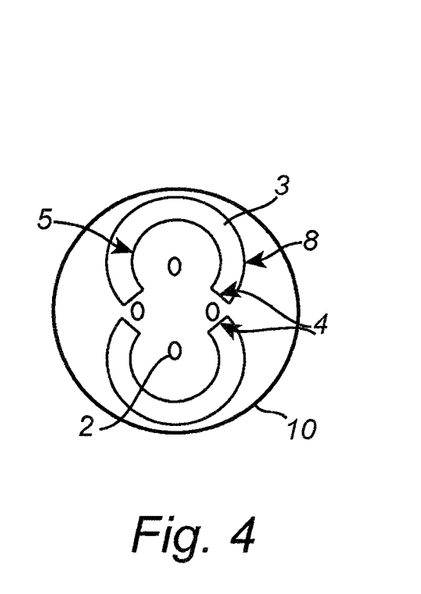

FIG. 4 is a schematic view of a cross-section of a light-emitting device 1 perpendicular to a longitudinal axis of the light-emitting device 1, according to an exemplifying embodiment of the present invention. The light-emitting device 1 illustrated in FIG. 4 is similar to the light-emitting device 1 illustrated in FIG. 3, and the same reference numerals in FIGS. 3 and 4 indicate the same or similar components, having the same or similar function(s). FIG. 4 illustrates a light-emitting device 1 comprising two light guides 3. The light guides 3 may enclose the LED filaments 2. The light guides 3 may each have several internal, or inner, surfaces 5, adapted for internal reflection of the incoupled light within the light guide 3, and several outer surfaces 8. Each of the light guides 3 may be configured so as to have in principle any number of internal or inner surfaces 5 and any number of outer surfaces 8. The LED filaments 2 and the light guides 3 are arranged such that light emitted by LED filaments 2 is incoupled by the incoupling features 4 of the light guides 3 into the light guides 3. FIG.

4 illustrates four incoupling features 4, being configured as edges. However, other configurations of the incoupling features 4 are possible.

Figure 5:
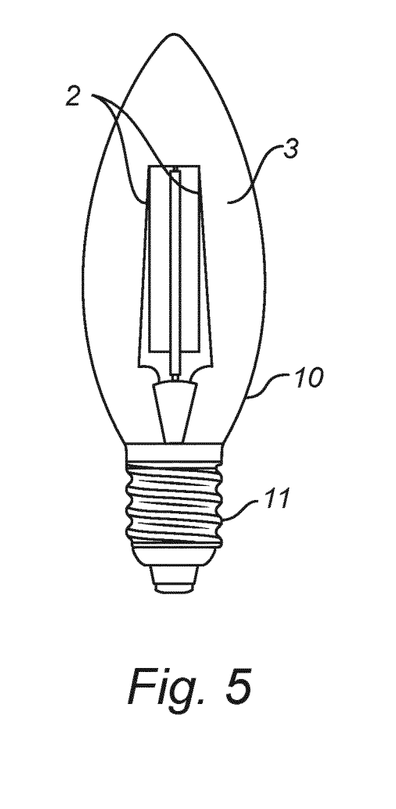
FIG. 5 is a schematic view of a light-emitting device according to an exemplifying embodiment of the present invention.

FIG. 5 is a schematic view of a light-emitting device 1 according to an exemplifying embodiment of the present invention. The light-emitting device 1 illustrated in FIG. 5 is similar to the light-emitting device 1 illustrated in FIG. 1, and the same reference numerals in FIGS. 1 and 5 indicate the same or similar components, having the same or similar function(s). The light-emitting device 1 illustrated in FIG. 5 comprises a light guide 3 that is centrally arranged in the light-emitting device 1 and that is extending along a longitudinal axis of the light-emitting device 1. The LED filaments 2 may be extending at a distance from and along the longitudinal axis of the light-emitting device 1. Compared to FIG. 1, FIG. 5 does not show any auxiliary LED light sources 7 or a driver unit 9, but it is to be understood that auxiliary LED light sources 7 and/or a driver unit 9 as illustrated in FIG. 1 may be included in the light-emitting device 1 illustrated in FIG. 5. In FIG. 5, the LED filaments 2 are illustrated as being connected to the connector 11. Further according to the embodiment of the present invention illustrated in FIG. 5, the transparent light exit window 10 may enclose the LED filaments 2 and the light guide 3, and may be connected to the connector 11.

Figure 6:
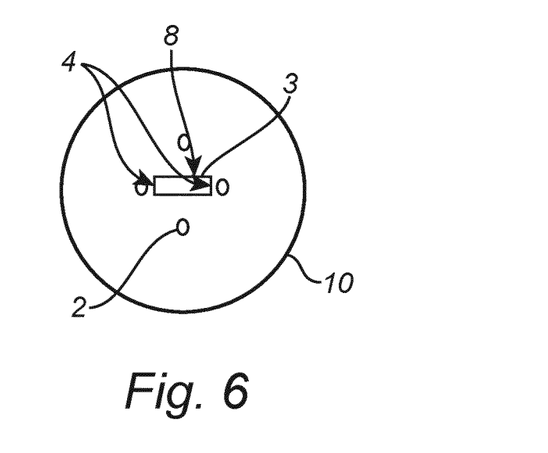
FIGS. 6 to 8 are schematic views of a cross-section of a light-emitting device perpendicular to a longitudinal axis of the light-emitting device, according to exemplifying embodiments of the present invention.

FIG. 6 is a schematic view of a cross-section of a light-emitting device 1 perpendicular to a longitudinal axis of the light-emitting device 1, according to an exemplifying embodiment of the present invention. The light-emitting device 1 illustrated in FIG. 6 is similar to the light-emitting device 1 illustrated in FIG. 3, and the same reference numerals in FIGS. 3 and 6 indicate the same or similar components, having the same or similar function(s). FIG. 6 shows a light-emitting device 1 comprising a light guide 3, four LED filaments 2 and a transparent light exit window 10. As illustrated in FIG. 6, the light guide 3 may be arranged centrally in the light-emitting device 1, and may extend along a longitudinal axis of the light-emitting device 1. The four LED filaments 2 may be arranged centrally in the light-emitting device 1 and at a distance from the light guide 3. The light guide 3 is illustrated as having two edges configured as incoupling features 4 to receive light emitted by the LED filaments 2 for incoupling into the light guide 3. It should be noted that there could be any number of light guides 3, which may comprise any number of incoupling features 4, internal or inner surfaces 5 and outer surfaces 8, and any number of LED filaments 2, included in the light-emitting device 1 illustrated in FIG. 6.

Figure 7:
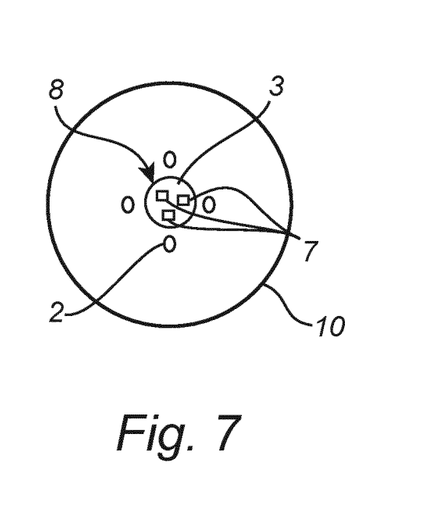

FIG. 7 is a schematic view of a cross-section of a light-emitting device 1 perpendicular to a longitudinal axis of the light-emitting device 1, according to an exemplifying embodiment of the present invention. The light-emitting device 1 illustrated in FIG. 7 is similar to the light-emitting device 1 illustrated in FIGS. 2 and 6, and the same reference numerals in FIGS. 2, 6 and 7 indicate the same or similar components, having the same or similar function(s). The light-emitting device 1 illustrated in FIG. 7 comprises three light sources 7 arranged centrally in the light-emitting device 1. The light sources 7 may comprise auxiliary LED light sources 7. The auxiliary LED light sources 7 may be adapted to emit light for incoupling into the light guide 3. The light guide 3 and/or the auxiliary LED light sources 7 may be arranged such that the light emitted by the auxiliary LED light sources 7 may be incoupled into the light guide 3 by means of at least one incoupling feature of the light guide 3 (not shown in FIG. 7; see FIGS. 3-4, 6, 8, 10-11, and 16), which at least one incoupling feature for example may be configured as one or more edges of the light guide 3, in accordance with the embodiment of the present invention illustrated in FIG. 7.

Figure 8:
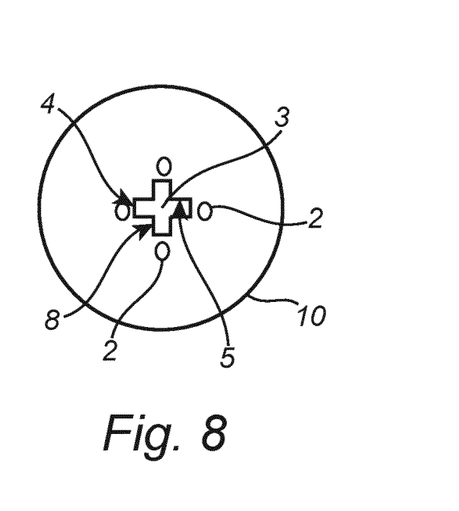

FIG. 8 is a schematic view of a cross-section of a light-emitting device 1 perpendicular to a longitudinal axis of the light-emitting device 1, according to an exemplifying embodiment of the present invention. The light-emitting device 1 illustrated in FIG. 8 is similar to the light-emitting device 1 illustrated in FIG. 6, and the same reference numerals in FIGS. 6 and 8 indicate the same or similar components, having the same or similar function(s). The light guide 3 shown in FIG. 8 has a cross-sectional shape similar to a cross. It should be noted that the cross-sectional shape of the light guide 3 in FIG. 8 is exemplary, and that a light guide 3 may have any other shape. The cross-sectional view of the light guide 3 in FIG. 8 shows four outer surfaces 8, eight internal or inner surfaces 5, and at least four incoupling features 4 of the light guide 3. The incoupling features 4 may be configured as edges of the light guide 3. The LED filaments 2 and/or the light guide 3 are arranged such that light emitted by the LED filaments 2 may be incoupled into the light guide 3 by means of the incoupling features 4. As illustrated in FIG. 8, the LED filaments 2 may extend at a distance from and along the respective edges of the light guide 3 that may serve as the incoupling features 4 of the light guide 3.

Figure 9:
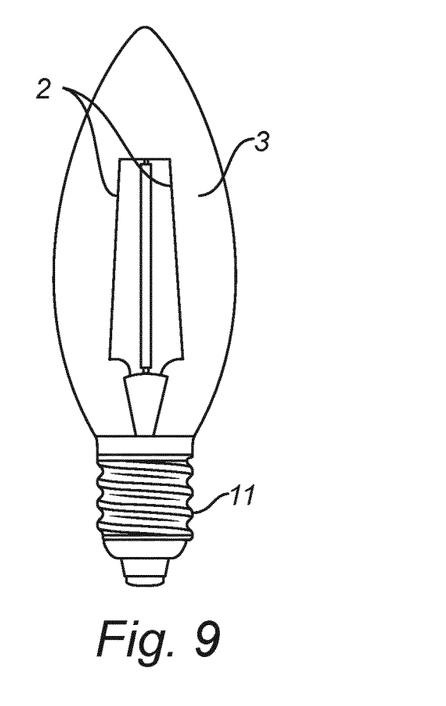
FIG. 9 is a schematic view of a light-emitting device, according to an exemplifying embodiment of the present invention.

FIG. 9 is a schematic view of a light-emitting device 1 according to an exemplifying embodiment of the present invention. The light-emitting device 1 illustrated in FIG. 9 is similar to the light-emitting device 1 illustrated in FIG. 5, and the same reference numerals in FIGS. 5 and 9 indicate the same or similar components, having the same or similar function(s). In contrast to the light-emitting device 1 illustrated in FIG. 5, in the light-emitting device 1 illustrated in FIG. 9, the light guide 3 is not centrally arranged in the light-emitting device 1 and extending along a longitudinal axis of the light-emitting device 1, but is instead configured as a light exit window, or an envelope, which in accordance with the embodiment of the present invention illustrated in FIG. 9 may enclose the LED filaments 2. The light guide 3 illustrated in FIG. 9 is connected to the connector 11.

Figure 10:
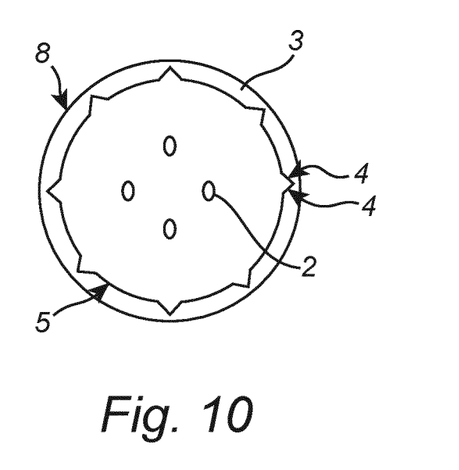
FIGS. 10 and 11 are schematic views of a cross-section of a light-emitting device perpendicular to a longitudinal axis of the light-emitting device, according to exemplifying embodiments of the present invention.

FIG. 10 is a schematic view of a cross-section of a light-emitting device 1 perpendicular to a longitudinal axis of the light-emitting device 1, according to an exemplifying embodiment of the present invention. The light-emitting device 1 illustrated in FIG. 10 is similar to the light-emitting device 1 illustrated in FIG. 9, and the same reference numerals in FIGS. 9 and 10 indicate the same or similar components, having the same or similar function(s). The light guide 3 of the light-emitting device 1 shown in FIG. 10 is configured as an envelope. In accordance with the embodiment of the present invention illustrated in FIG. 10, the light guide 3 encloses the LED filaments 2. As illustrated in FIG. 10, the light guide 3 may comprise two internal or inner surfaces 5 and two outer surfaces 8. The light guide 3 in FIG. 10 is illustrated as having eight incoupling features 4 configured as indents and/or facets. It should however be noted that the number of internal or inner surfaces 5, outer surfaces 8 and incoupling features 4, respectively, is exemplary, and that the light guide 3 may comprise any number of internal inner surfaces 5, outer surfaces 8 and incoupling features 4, respectively. The incoupling features 4 in the form of indents and/or facets that are shown in FIG. 10 are arranged in the one of the outer surfaces 8 of the light guide 3 that is closest to the longitudinal axis of the light-emitting device 1. The indents and/or facets could in alternative or in addition be employed as outcoupling features.

Figure 11:
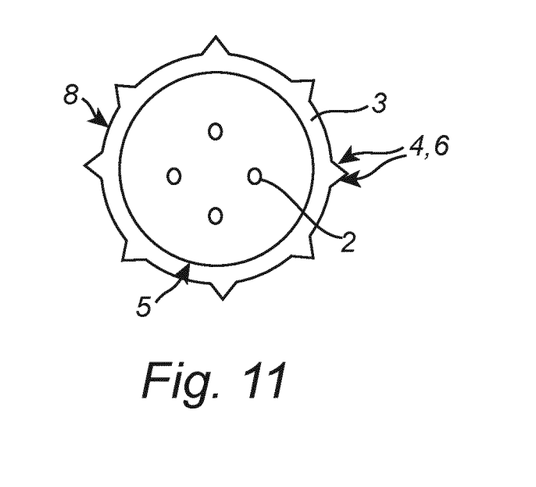

FIG. 11 is a schematic view of a cross-section of a light-emitting device 1 perpendicular to a longitudinal axis of the light-emitting device 1, according to an exemplifying embodiment of the present invention. The light-emitting device 1 illustrated in FIG. 11 is similar to the light-emitting device 1 illustrated in FIG. 10, and the same reference numerals in FIGS. 10 and 11 indicate the same or similar components, having the same or similar function(s). In accordance with the embodiment of the present invention illustrated in FIG. 11, there are facets and/or edges arranged in an outer surface 8 of the light guide 3 that is opposite to the outer surface 8 of the light guide 3 that is closest to the longitudinal axis of the light-emitting device 1. The facets and/or edges may be employed as incoupling features 4 and/or outcoupling features 6 of the light guide 3. Even though in FIG. 11 there is no illustration of indents and/or facets arranged in the one of the outer surfaces 8 of the light guide 3 that is closest to the longitudinal axis of the light-emitting device 1, as in FIG. 10, it is to be understood that indents and/or facets may be arranged also in the one of the outer surfaces 8 of the light guide 3 that is closest to the longitudinal axis of the light-emitting device 1 illustrated in FIG. 11.

Figure 12:
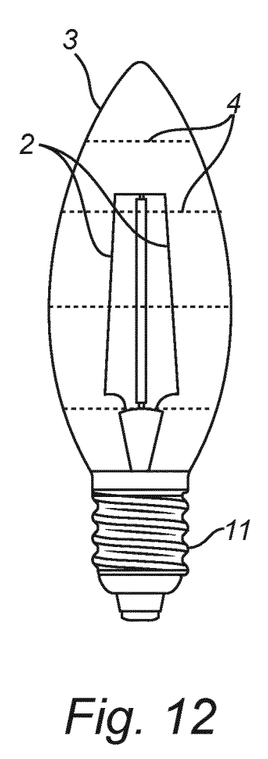
FIGS. 12 to 14 are schematic views of a light-emitting device, according to exemplifying embodiments of the present invention.

FIG. 12 is a schematic view of a light-emitting device 1 according to an exemplifying embodiment of the present invention. The light-emitting device 1 illustrated in FIG. 12 is similar to the light-emitting device 1 illustrated in FIG. 9, and the same reference numerals in FIGS. 9 and 12 indicate the same or similar components, having the same or similar function(s). In accordance with the exemplary embodiment illustrated in FIG. 12, the light guide 3, which is configured as a light exit window, or an envelope, which in accordance with the embodiment of the present invention illustrated in FIG. 12 may enclose the LED filaments 2, may have decorative features which may serve as incoupling features 4. Possibly, the incoupling features 4 may also provide for a light outcoupling functionality for the light guide 3. In FIG. 12, the decorative features, or incoupling features 4, are illustrated as having shapes of circumferential lines on a surface of the light guide 3 of the light-emitting device 1, with the circumferential lines being in planes perpendicular to a longitudinal axis of the light-emitting device 1. However, it should be appreciated that the decorative features, or incoupling features 4, of the light guide 3 may have any other shape or form.

Figure 13:
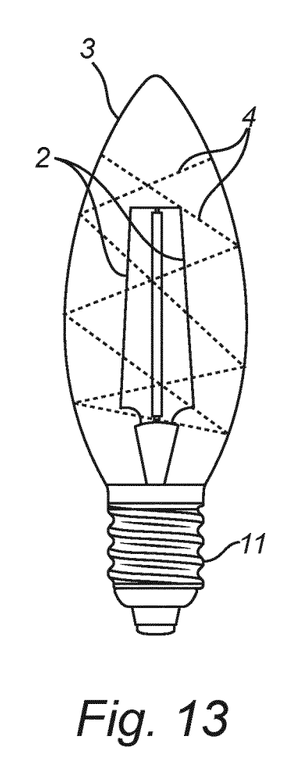

FIG. 13 is a schematic view of a light-emitting device 1 according to an exemplifying embodiment of the present invention. The light-emitting device 1 illustrated in FIG. 13 is similar to the light-emitting device 1 illustrated in FIG. 12, and the same reference numerals in FIGS. 12 and 13 indicate the same or similar components, having the same or similar function(s). FIG. 13 illustrates a different shape of the decorative features, or incoupling features 4, of the light guide 3 than the one illustrated in FIG. 12. In FIG. 13, the decorative features, or incoupling features 4, are illustrated as having shapes shown as lines on or across a surface of the light guide 3 of the light-emitting device 1.

Figure 14:
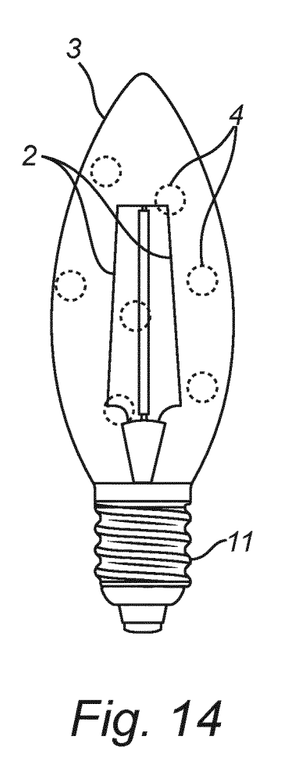

FIG. 14 is a schematic view of a light-emitting device 1 according to an exemplifying embodiment of the present invention. The light-emitting device 1 illustrated in FIG. 14 is similar to the light-emitting device 1 illustrated in FIGS. 12 and 13, and the same reference numerals in FIGS. 12, 13 and 14 indicate the same or similar components, having the same or similar function(s). FIG. 14 illustrates a different shape of the decorative features, or incoupling features 4, of the light guide 3 than the ones illustrated in FIGS. 12 and 13. In FIG. 14, the decorative features, or incoupling features 4 are illustrated as having shapes of dots on a surface of the light guide 3 of the light-emitting device 1. The dots may for example be paint dots.

Figure 15:
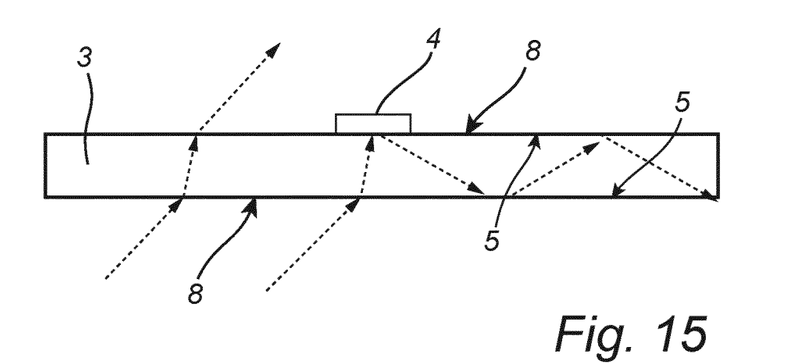
FIGS. 15 and 16 are schematic views of a cross-section of a part or portion of a light guide of a light-emitting device, according to exemplifying embodiments of the present invention.

FIG. 15 is a schematic view of a cross-section of a part or portion of a light guide 3 of a light-emitting device according to an exemplifying embodiment of the present invention. The same reference numerals in FIG. 15 and in FIGS. 1-14 indicate the same or similar components, having the same or similar function(s). In accordance with the embodiment of the present invention illustrated in FIG. 15, the light guide 3 comprises an incoupling feature 4 in the form of a structure arranged on an outer surface 8 of the light guide configured for incoupling of light into the light guide 3. The structure may for example be attached to an outer surface 8, and may for example comprise paint (e.g., one or more paint dots). The incoupling feature 4 may for example comprise a grouping, e.g., an array, of tiny particles such as dots (e.g., paint dots). In alternative or in addition, the incoupling feature 4 could comprise surface roughness and/or a scattering light guide material. The incoupling feature 4 may be arranged such that it is invisible to the naked eye of a viewer. This may be facilitated or enabled for example by means of the incoupling feature 4 comprising a grouping, e.g., an array, of tiny particles such as dots (e.g., paint dots), as mentioned in the foregoing. As illustrated in FIG. 15, the incoupling feature 4 may couple light into light guide 3, after which the light may be internally reflected within the light guide 3 on the internal surfaces 5, e.g., via total internal reflection. The dashed arrows in FIG. 15 represent light.

Figure 16:
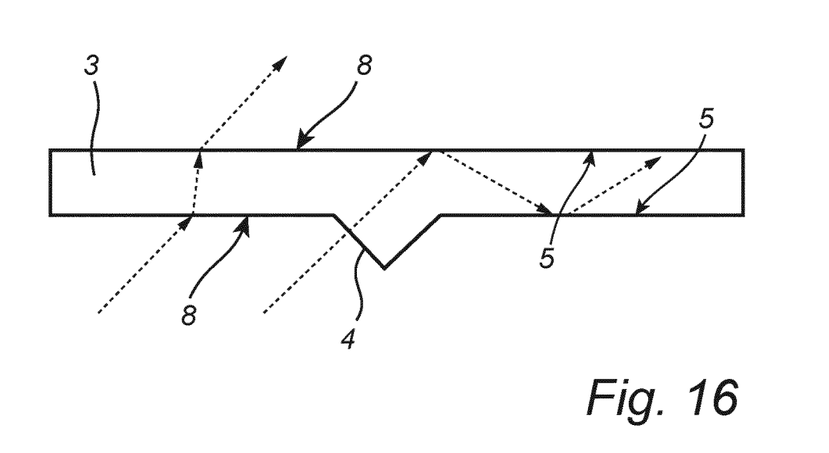

FIG. 16 is a schematic view of a cross-section of a light guide 3 of a part or portion of a light-emitting device according to an exemplifying embodiment of the present invention. The light guide 3 illustrated in FIG. 16 is similar to the light guide 3 illustrated in FIG. 15, and the same reference numerals in FIGS. 15 and 16 indicate the same or similar components, having the same or similar function(s). In accordance with the embodiment of the present invention illustrated in FIG. 16, the light guide 3 comprises an incoupling feature 4 in the form of a surface structure integrally arranged in an outer surface 8 of the light guide 3. The structure may for example comprise a protruding facet, as illustrated in FIG. 16, and/or an indent. In alternative or in addition, the structure could provide a light outcoupling functionality, and may hence, in alternative or in addition, constitute or be a part or portion of an outcoupling feature of the light guide 3.

In conclusion, a light-emitting device is provided. The light-emitting device comprises a transparent light exit window, and a LED filament adapted for emitting a first light output along one or more light output directions through the transparent light exit window. The light-emitting device comprises a light guide. The light guide comprises an incoupling feature, configured for receiving light emitted by a light source and for coupling the light emitted by the light source into the light guide. The light source comprises or is constituted by at least one of the LED filament or a separate light source comprised in the light-emitting device. The light guide further comprises at least one internal surface adapted for internal reflection of the incoupled light within the light guide, and an outcoupling feature configured for outcoupling of light having been internally reflected within the light guide from the light guide, thereby emitting a second light output, the second light output being superimposed onto the first light output when viewed along the one or more light output directions.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A light-emitting device comprising:
a transparent light exit window;
a light-emitting diode (LED) filament adapted for emitting a first light output along one or more light output directions through the transparent light exit window, and
at least one light guide being configured as an envelope at least in part enclosing the LED filament, and comprising:
an incoupling feature configured for receiving light emitted by a light source and for coupling the light emitted by the light source into the light guide, the light source comprising or being constituted by at least one of the LED filament or a separate light source comprised in the light-emitting device,
at least one internal surface adapted for internal reflection of the incoupled light within the light guide, and
an outcoupling feature configured for outcoupling of light having been internally reflected within the light guide from the light guide, thereby emitting a second light output, the second light output being superimposed onto the first light output when viewed along the one or more light output directions,
wherein the light-emitting device further comprises an auxiliary LED light source, wherein the light source comprises the auxiliary LED light source, and wherein the incoupling feature is configured for incoupling of light emitted by the auxiliary LED light source, and
wherein the light source is configured to:
emit light for incoupling into the light guide when the luminous flux of the light emitted by the LED filament is above a predetermined value, and/or
increase the luminous flux of its emitted light for incoupling into the light guide if the luminous flux of the light emitted by the LED filament increases, and/or
emit light for incoupling into the light guide, wherein the luminous flux of the emitted light for incoupling is higher than the luminous flux of the light emitted by the LED filament when the luminous flux of the light emitted by the LED filament is above a predetermined value.

2. A light-emitting device according to claim 1, wherein the light guide is arranged such that the outcoupling feature is not visible to the naked eye of a viewer at a distance of at least one meter between the naked eye of the viewer and the light guide when no light is incoupled into the light guide.

3. A light-emitting device according to claim 1, wherein the incoupling feature comprises at least one of a surface structure integrally arranged in an outer surface of the light guide configured for incoupling of light or a structure arranged on an outer surface of the light guide configured for incoupling of light.

4. A light-emitting device according to claim 1, wherein the outcoupling feature is arranged such that the outcoupling of light via the outcoupling feature is over the entirety of an outer surface of the light guide.

5. A light-emitting device according to claim 1, wherein the light guide is arranged to at least in part enclose the LED filament.

6. A light-emitting device according to claim 1, wherein the LED filament extends at a distance from and along an outer surface of the light guide.

7. A light-emitting device according to claim 1, wherein the outcoupling feature comprises at least one of a surface structure integrally arranged in an outer surface of the light guide configured for outcoupling of light, a structure arranged on an outer surface of the light guide, or an internal structure within the light guide configured for at least one of refraction of light and or total internal reflection.

8. A light-emitting device according to claim 1, wherein the light source is configured to emit light for incoupling into the light guide such that the light outcoupled from the light guide has a lower luminous flux than the luminous flux of the light emitted by the LED filament.

9. A lamp, luminaire or lighting system comprising a light-emitting device according to claim 1.

* * * * *